Sept. 24, 1929.  A. U. PREMONT  1,729,086
WINDSHIELD FOR MOTOR CYCLES
Filed March 19, 1928   2 Sheets-Sheet 2
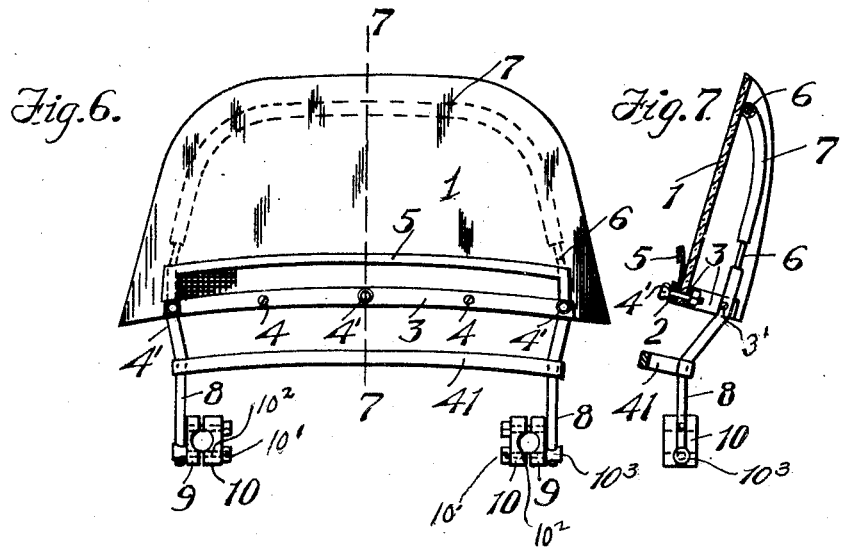
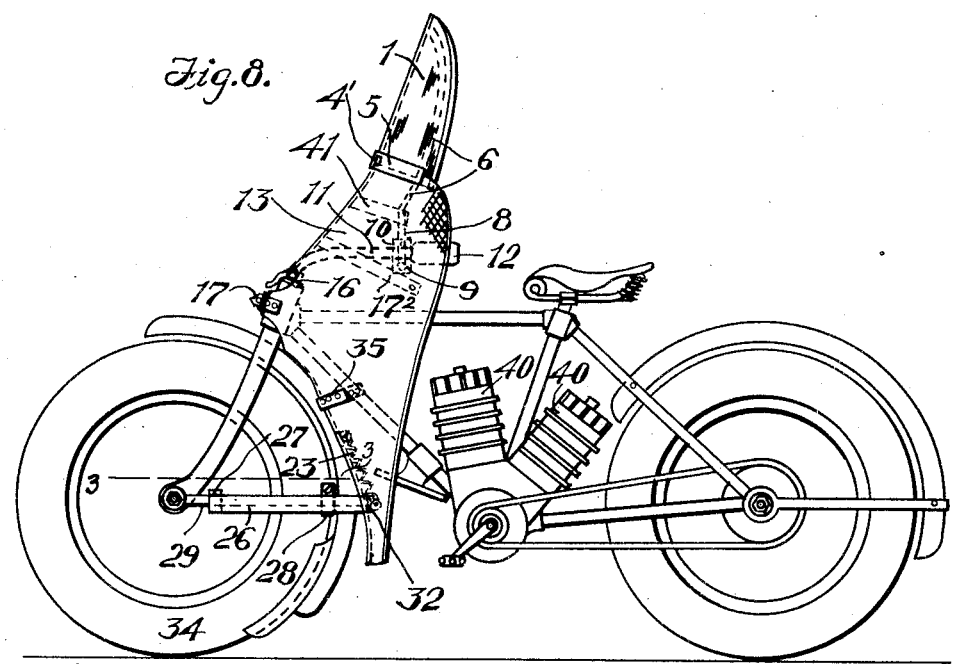
INVENTOR.
Alphonse U. Premont.
BY
Harry W. Bowen,
ATTORNEY.

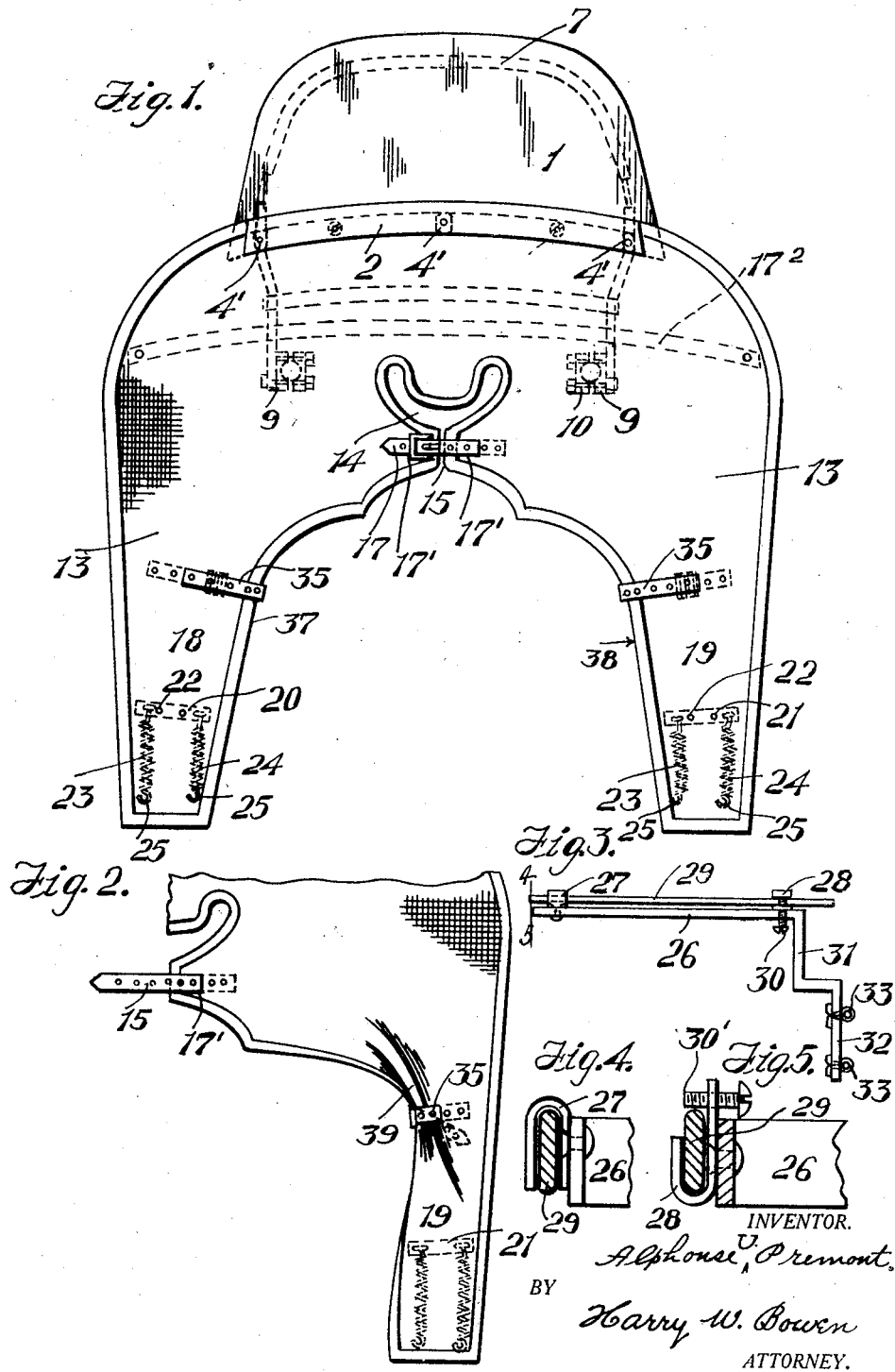

Patented Sept. 24, 1929

1,729,086

UNITED STATES PATENT OFFICE

ALPHONSE U. PREMONT, OF SPRINGFIELD, MASSACHUSETTS

WINDSHIELD FOR MOTOR CYCLES

Application filed March 19, 1928. Serial No. 262,629.

This invention relates to improvements in windshields for motorcycles. An object of the invention is to provide a windshield that may be readily attached to and removed from the machine. It has for a further object to provide a windshield in which there are formed depending portions for protecting the leg of the driver when in use. The windshield is supported on the machine by means of a suitable strap device which passes around the usual steering post casing and below the handle bars. The lower end portions of the depending leg protecting portions are each provided with springs which are attached to a bar or brace member that is placed on and connected to the mud guard supporting rod of the front wheel of the machine. This bar or brace may be readily placed on this rod support which supports the mud guard. The depending leg protecting parts are provided with a buckle and strap for puckering the fabric in order to allow more of the cooling air to reach the cylinders of the engine. The upper end of the windshield is preferably formed of transparent celluloid while the lower portion is formed of heavy fabric, as canvas. The joint connecting the celluloid and fabric is provided with a strip of leather for permitting the water on the outside to flow downward on the windshield and onto the outer side of the canvas.

Referring to the drawings:

Fig. 1 is a front elevational view of the windshield removed from the machine and showing the depending leg protecting portions, the springs carried by these portions, and the straps for puckering the depending leg canvas.

Fig. 2 is a side elevational view of the lower end of one of the leg protecting portions showing the strap for puckering or drawing in the canvas.

Fig. 3 is a plan view of a portion of one of the front wheel mud guard supporting rods with a bracket attached thereto for connecting the springs of a leg protecting portion of the windshield.

Figs. 4 and 5 are detail views partially in section, of the mud guard supporting rod, the sections being taken on the line 4—5 of Fig. 3.

Fig. 6 is an elevational view of the windshield looking from the outside, showing the upper portion of the same.

Fig. 7 is a vertical sectional view on the line 7—7 of Fig. 6, and

Fig. 8 is a side elevational view of the windshield applied or attached to a motorcycle.

Referring to the drawings in detail:

1 designates a transparent piece of celluloid that is located at the upper end of the windshield. This piece is secured at its lower end between the two metal transversely located bars 2 and 3 by means of the short bolts 4. 5 is a strip of leather or other material that is also secured between the two bars 2 and 3, (see Fig. 7) and against the lower edge of the piece of celluloid 1. This piece of leather is bent over and downward, as shown in Fig. 8, for the purpose of directing the flow of water. Attached to the inside bar 3 at 3' is the U-shaped rod 6 that extends upward on the inner surface of the celluloid. This bar is preferably covered with a rubber tube 7, for the purpose of preventing the chafing of the rod 6 against the celluloid. This rod also extends downward, as shown at 8. Attached to the lower end portions 8 are the two clamps 9 and 10. These clamps are formed with curved recesses and are for attaching the windshield to the handle bars 11 at a point directly in front of the nibs guards 12, as shown in Fig. 8.

13 designates the canvas portion which is detachably connected to the lower edge of the celluloid by means of the snap fasteners 4' which are located on the outer side of the metal cross bar 2. This canvas portion is formed with an opening 14 and a slit 15 which receives the casing of the usual steering post 16 of the machine. 17 is a strap for buckling the adjacent portions 17' of the canvas 13 around the steering post casing. 17² is a stiffening bar which is located between the inner and outer layers of the canvas. 18 and 19 are the depending leg protecting portions of the canvas. Attached to these portions are the iron bars 20 and 21 by means of the rivets 22. 23 and 24 are springs which are secured to the plates 20 and 21 at their upper ends, the lower ends of which are formed with hooks 25. 26 is a bar or bracket member that is formed with the two U-shaped loops 27 and 28 at their opposite ends. These loops are for attaching the bracket member 26 to the rod 29 that supports the mud guard 30 of the front wheel. The loop 27 passes over the top of the mud guard supporting rod 29 (see Fig. 4). The loop 28 passes under the rod 29, as shown in Fig. 5. 30' is a screw which passes through loop 28 for retaining the bracket 26 in place on the rod 29. The bracket 26 is formed with the offset arm portions 31 and 32. In the arm 32 are the eyes 33. These eyes are for receiving the hooks 25 of the springs 23 and 24. It will therefore be seen that when the windshield is attached to the motorcycle the handle bars will turn the lower depending leg protecting portions 18 and 19 when the front wheel 34 is turned. The straps 35 which pass around the inner edges 37 and 38 of the portions 18 and 19 are for the purpose of drawing the leg protecting parts into a contracting position, as shown in Fig. 2 at 39, whereby a greater opening is provided to permit the flow of air to reach the cylinders 40. 41 is a tie rod that extends from the depending portions 8 for rigidly retaining these rods in place. It is of course obvious that the canvas portion may be detached from the celluloid part without disturbing the celluloid shield part.

The straight portions 8 of the U-shaped rod 6 permits the two clamps 9 and 10 to be raised or lowered for the purpose of adjusting the vertical position of the windshield. When the nuts 10' on the bolts 10² are tightened the clamp 9 and 10 are firmly secured to the portions 8 of the rod 6. The bolts 10² are connected to the swivel pieces 10³ on the portions 8 of the U-shaped rod 6.

What I claim is:

1. A windshield attachment for motorcycles comprising in combination with a transparent portion at its upper end, a fabric portion detachably secured to the transparent portion and formed with oppositely located depending leg portions, means for securing the windshield to the handle bars of the motorcycle, means for securing the fabric portion directly to the upper end of the steering post casing, and means for securing the depending leg projecting portions to the front wheel mud guard supporting part of the machine, whereby the said leg protecting portions will be operated with the movements of the handle bars.

2. In a windshield device for motorcycles having a transparent upper portion and detachable canvas lower leg protecting portions, means for securing the upper part of the lower leg protecting portions to the steering post casing, supporting means for attaching the device to the handle bars, the lower leg protecting portions having springs secured thereto, brackets attached to the front wheel mud guard supporting portion of the machine and to which brackets the springs are connected.

3. In a windshield device for motorcycles having a frame to which the device is secured, adjustable clamping means for attaching the frame to the handle bars, means for supporting the device on the steering post casing, depending leg protecting portions having devices attached thereto for contracting said portions, and means for connecting the leg portions to the front wheel mud guard supporting means of the machine.

4. A lower detachable fabric portion for a two-part windshield for motorcycles comprising a windshield frame, a member which is formed with depending leg protecting portions, springs secured near the lower ends of the said depending portions for attaching the same to the front wheel mud guard a part of the motorcycle, and means at the upper end of the fabric portion for attaching the member to the windshield frame.

5. A two part windshield for motorcycles comprising upper and lower portions, the upper portion having a U-shaped bar to which the upper portion is secured, adjustable means for securing said bar to the handle bars of the machine, two bars between which the lower edge of the upper portion is clamped, fastening devices on said bars, cooperating fastening devices on the upper edge of the lower portion, a piece interposed between the upper and lower portion for directing the flow of water from the lower edge of the upper portion onto the upper edge of the lower portion, and spring means for attaching the lower portion to the front wheel mud guard support member.

6. A windshield for motorcycles comprising a bar having adjustable means thereon for attaching the windshield to the handle bars, a fabric part detachably secured to the windshield and having depending leg portions, spring means for attaching the depending leg portions to the front wheel frame to permit the windshield to turn with the front wheel.

7. Means for attaching a windshield to the mud guard supporting rod of the front wheel of a motorcycle comprising a bracket having spaced U-shaped parts that are oppositely inverted to receive the said rod.

8. A windshield for motorcycles comprising an upper transparent part, a support for said part for adjustably securing the same to the handle bars, a fabric part detachably secured to the transparent part, means for attaching the lower ends of the fabric part so as to move with the front wheels and handle bars, and means mounted in the fabric for drawing in or puckering a portion of the fabric for varying the flow of air to the engine, as described.

9. A windshield for motorcycles having in combination, depending leg portions, means for adjustably attaching the said portions to the front wheel of the motorcycle, and means for puckering or contracting the said leg portions for varying the current of air to the engine.

ALPHONSE U. PREMONT.